(12) United States Patent
Sasaki (10) Patent No.: US 6,257,657 B1
(45) Date of Patent: Jul. 10, 2001

(54) VEHICULAR HOOD APPARATUS

(75) Inventor: Sakae Sasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/610,187

(22) Filed: Jul. 5, 2000

(30) Foreign Application Priority Data

Jul. 8, 1999 (JP) ................................................ 11-194670

(51) Int. Cl.[7] .................................................. B62D 25/12
(52) U.S. Cl. ........................................ 296/194; 180/69.12
(58) Field of Search ..................... 296/194, 76; 180/189, 180/69.21

(56) References Cited

U.S. PATENT DOCUMENTS

| | | | |
|---|---|---|---|
| 3,709,316 | * 1/1973 | Glance | ............................. 296/194 X |
| 4,572,314 | 2/1986 | Anguera . | |
| 4,753,475 | * 6/1988 | Mochida | ........................ 180/69.21 X |

FOREIGN PATENT DOCUMENTS

| | | |
|---|---|---|
| 1455679 | 3/1969 | (DE) . |
| 4445327C1 | 4/1996 | (DE) . |
| 9-315266 | 5/1996 | (JP) . |
| 10-258774 | 3/1997 | (JP) . |
| 11-34925 | 7/1997 | (JP) . |

OTHER PUBLICATIONS

Patent Abstracts of Japan, 10007026A, Jan. 13, 1998; Car Vody Rear Part Structure of Automobile.
Patent Abstracts of Japan, 09240510A, Sep. 16, 1997; Body Rear Part Structure of Automobile.
Specification of Application No.: 09/611,930.
Specification of Application No.: 09/611,249.
Specification of Application No.: 09/613,125.
Specification of Application No.: 09/619,323.

* cited by examiner

*Primary Examiner*—Joseph D. Pape
(74) *Attorney, Agent, or Firm*—Merchant & Gould P.C.

(57) ABSTRACT

A vehicular hood apparatus (20) includes a link mechanism (32) and a temporal fastening member (50). The link mechanism is interposed between a vehicle body frame (17) and a hood (21). The link mechanism is extended and contracted in correspondence to upward and downward motions of the hood. When the link mechanism is contracted, the member fastens the contracted link mechanism to a bracket (33) mounted on the vehicle body frame so as to prevent the contracted link mechanism from rattling. As the hood is lifted up, the member is cut to thereby permit the link mechanism to be extended.

3 Claims, 7 Drawing Sheets

VEHICULAR HOOD APPARATUS

BACKGROUND OF THE INVENTION

1. Field of the Invention

The present invention relates to a vehicular hood apparatus including a hood sufficiently deformable in a lifted position to absorb an impact of an obstacle on the hood.

2. Description of the Related Art

There are known vehicular hood apparatuses provided on vehicles. These apparatuses are arranged such that a hood of the apparatus is lifted a given amount and then held in a lifted position when the vehicle hits an obstacle. The hood thus lifted provides increased possible amount of downward deformation thereof. That is, the hood held in the lifted position can be deformed more downwardly. Thus, when the vehicle hits the obstacle and the obstacle is thereby thrown onto the hood held in the lifted position, the hood can greatly absorb an impact of the obstacle thereon. One example of such a vehicular hood apparatus is disclosed in Japanese Patent Laid-Open No. HEI 10-258774 entitled "LIFTING TYPE HOOD". The disclosed apparatus has a construction as shown in FIGS. 9 and 10 hereof.

Figure 9:
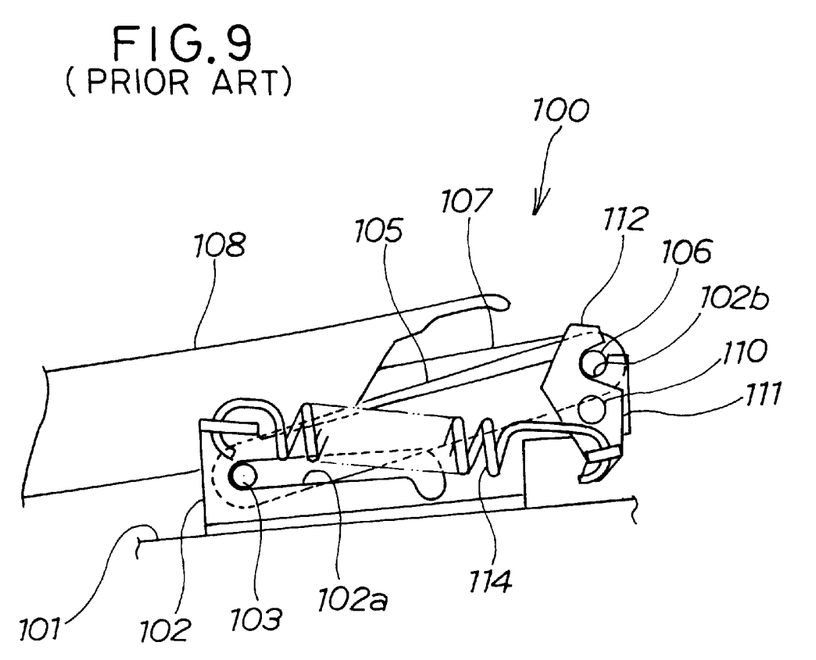
FIG. 9 is a side elevational view of a conventional vehicular hood apparatus with a hood of the apparatus closed.
Figure 10:
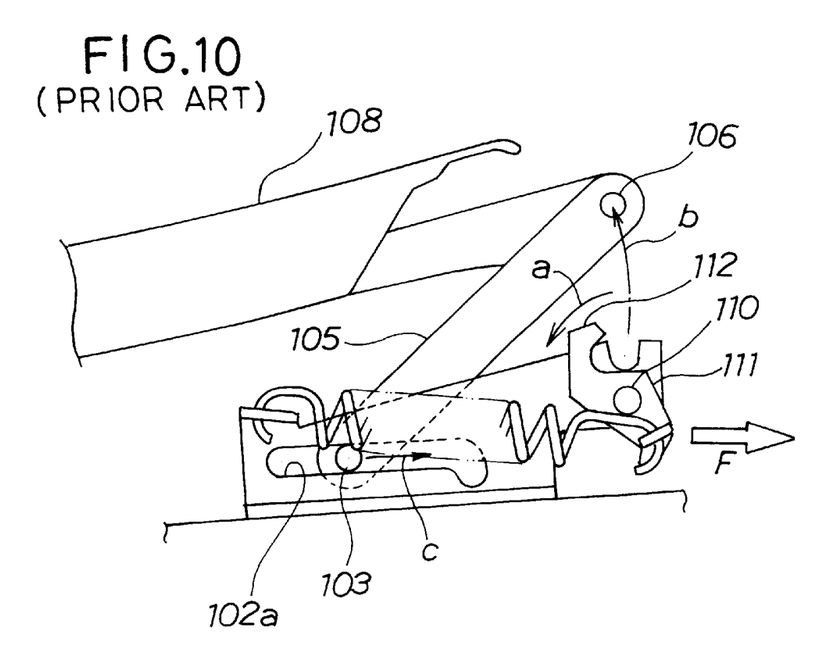
FIG. 10 is a side elevational view of the conventional vehicular hood apparatus with the hood lifted.

FIG. 9 shows a vehicular hood apparatus 100 having a hood 108 closed.

The vehicular hood apparatus 100 includes a bracket 102 attached to a vehicle body 101 of a vehicle. In the bracket 102, there is formed an elongated guide aperture 102a. A link 105 has a lower end portion supported by a lower pin 103. The lower pin 103 is disposed to move along a longitudinal direction of the aperture 102a. The link 105 has an upper end portion connected to a hood arm 107 through an upper pin 106. A lock piece 111 is mounted to the bracket 102 in such a manner as to pivot on a stationary pin 110. Between the lock piece 111 and the bracket 102, there is mounted a coil spring 114. The spring 114 normally urges a claw 112 of the lock piece 111 in such a direction that the claw 112 is engaged with the upper pin 106.

With the upper pin 106 thus engaged with the claw 112 of the lock piece 111, the upper pin 106 is retained in a U-shaped groove 102b formed in the bracket 102. The link 105 is thus fixed to thereby prevent the closed hood 108 from rattling vertically.

On the other hand, when the claw 112 of the lock piece 111 is disengaged from the upper pin 106, the link 105 is unfixed. The hood 108 is then lifted a given amount in a manner as discussed below.

Reference is made to FIG. 10. The hood 108 is placed in a lifted position.

When the vehicle hits an obstacle, an actuator (not shown) is operated to apply a lifting force to the hood 108. At the same time, an unlock force F is exerted on the lock piece 111, as indicated by an arrow. The lock piece 111 then pivots on the stationary pin 110, as indicated by an arrow A, to thereby disengage the claw 112 from the upper pin 106. The link 105 is therefore unfixed.

Subsequently, the upper pin 106 is raised together with the hood 108, as indicated by an arrow B, while the lower pin 103 moves along the guide aperture 102a, as indicated by an arrow C. Consequently, the hood 108 is lifted the given amount. By thus lifting the hood 108, it becomes possible to provide the hood 108 with increased possible amount of downward deformation thereof. Therefore, when the vehicle hits the obstacle and the obstacle is thereby thrown onto the hood lifted in the above-described manner, the hood can greatly absorb an impact of the obstacle thereon.

However, the upper pin 106 should be locked with the claw 112 of the lock piece 111 so as to prevent the closed hood 108 from rattling, as shown in FIG. 9. The lock piece 111 and the spring 114 for holding the lock piece 111 in a locked state are thus required.

The lock piece 111 in the locked state should be brought to an unlocked state when the vehicle hits the obstacle. Therefore, there is required an operation mechanism for bringing the lock piece 111 to the unlocked state.

For this reason, the number of parts for the apparatus 100 is inevitably increased. This increases a cost of the apparatus 100.

SUMMARY OF THE INVENTION

An object of the present invention is to provide a vehicular hood apparatus formed by a small number of parts to reduce the cost thereof.

According to an aspect of the present invention, there is provided a vehicular hood apparatus including a hood positioned at a front part of a vehicle, wherein when the vehicle hits an obstacle, the hood is lifted a predetermined amount and then held in a lifted position, the apparatus comprising: a link mechanism interposed between the hood and a vehicle body frame of the vehicle, the mechanism being extended and contracted in correspondence to upward and downward motions of the hood; and a temporal fastening member strengthened to such an extent as to be cut when the link mechanism is extended, wherein when the link mechanism is contracted, the temporal fastening member fastens the contracted link mechanism to a side of the vehicle body so as to prevent the contracted link mechanism from rattling.

In a preferred form of the present invention, the link mechanism comprises: a bracket mounted on the vehicle body frame; a hood arm mounted to the hood; a lower link pivoting on a lower pin through which one end portion of the lower link is attached to the bracket; an upper link pivoting on an upper pin through which one end portion of the upper link is attached to the hood arm; and a connecting pin through which another end portion of the lower link is connected to another end portion of the upper link, the lower link and the upper link pivoting towards and away from each other on the connecting pin.

Preferably, the temporal fastening member may include a cutout-formed portion to be cut off. It therefore becomes possible to readily cut the member by cutting off the cutout-formed portion.

The member fastens the contracted link mechanism to the side of the vehicle body. By thus providing the member alone, it becomes possible to prevent the hood from rattling. This reduces the number of parts for preventing the rattling of the hood. Further, by solely cutting the member, it becomes possible to extend the link mechanism. Thus, there is no need to provide any separate member for extending the link mechanism. This reduces the number of parts for extending the link mechanism.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
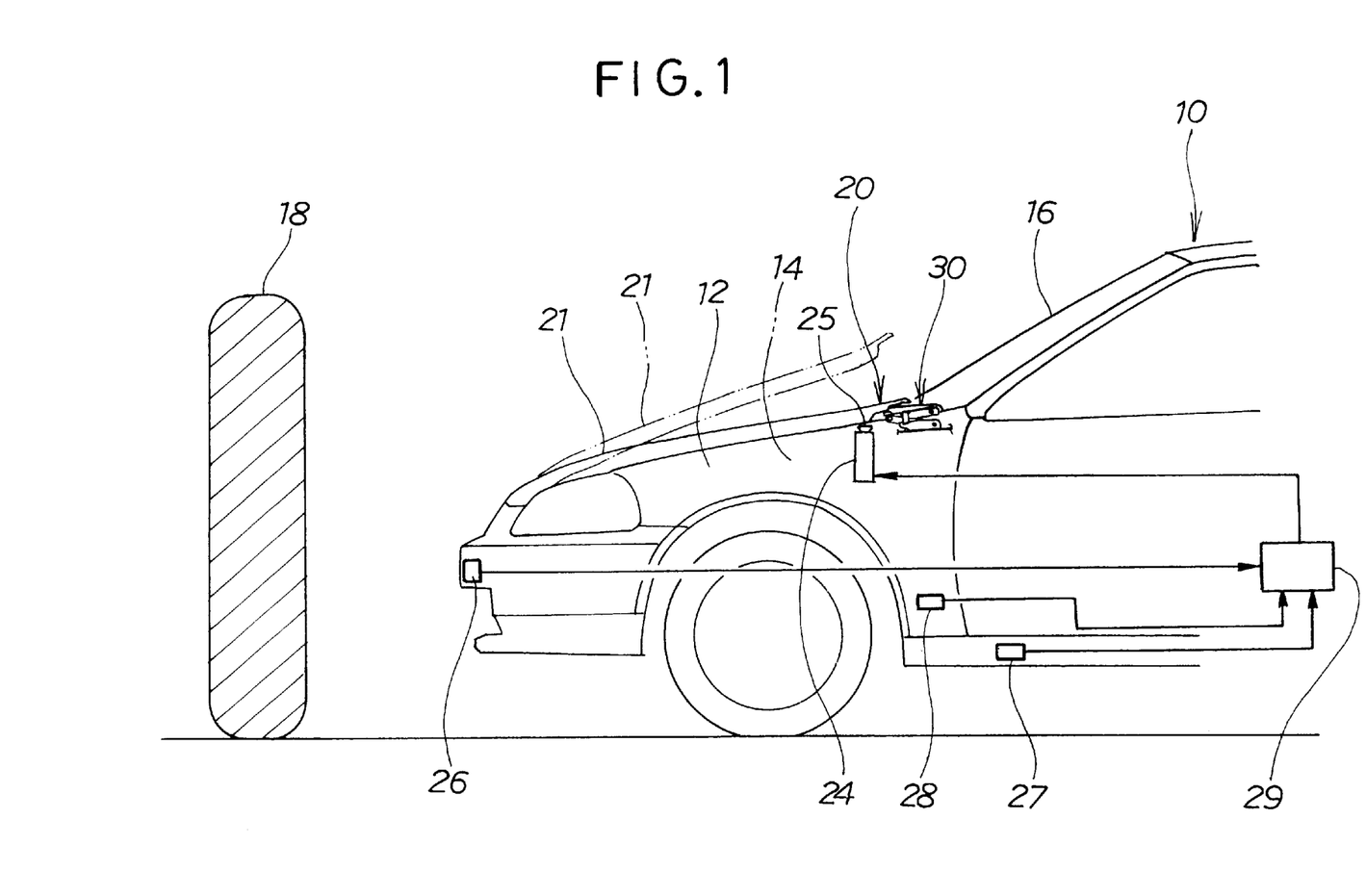
FIG. 1 is a side elevational view of a vehicle on which a vehicular hood apparatus of the present invention is mounted.

Referring to FIG. 1, a vehicle 10 includes right and left front fenders 12, 12 (only one shown). The right and left front fenders 12, 12 form an engine room 14 therebetween. A vehicular hood apparatus 20 is disposed forwardly of a windshield 16 and at an upper part of the engine room 14. The apparatus 20 functions to absorb an impact of an obstacle 18 on a hood 21, positioned at a front part of the vehicle 10, when the vehicle 10 hits the obstacle 18 and the obstacle 18 is thereby thrown onto the hood 21.

When the vehicle 10 hits the obstacle 18, the apparatus 20 is operated to bring the hood 21 to a lifted position as shown by a phantom line and then hold the hood 21 in the lifted position. The apparatus 20 will be described hereinafter.

The vehicular hood apparatus 20 includes the hood 21 for closing an opening formed at the upper part of the engine room 14, right and left actuators 24, 24 (only one shown), a bumper sensor 26, a floor sensor 27, a vehicle speed sensor 28, a controlling section 29 for driving the actuators 24, 24 and hood retaining means 30 (only one shown). Each actuator 24 is provided for pushing up right and left rear ends of the hood 21 so as to lift the hood 21 to the lifted position. The hood retaining means 30 supports the right and left rear ends of the hood 21 so as to hold the hood 21 in the lifted position. Each of the sensors 26, 27, 28 serves to detect the hitting of the vehicle 10 and then supply the section 29 with a detecting signal as described later. On the basis of the detecting signals from the sensors 26, 27, 28, the section 29 provides each actuator 24 with a drive signal as set forth later. The right and left actuators 24 are identical in construction to each other. Similarly, the left hood retaining means 30 has the same construction as the right hood retaining means. Thus, the left ones of the actuators 24 and the hood retaining means 30 are described hereinbelow, and the descriptions of the right ones of the actuators 24 and the hood retaining means 30 are omitted.

The hood 21 includes a hood lock (not shown) mounted to a front part thereof. The hood 21 is fixed to a vehicle body frame 17 through such a hood lock. The hood 21 turns on a rear part thereof serving as a fulcrum, such that the engine room 14 is opened. The engine room 14 thus opened can be repaired or checked.

The actuator 24 is attached to the frame 17. The actuator 24 includes a rod 25 and an inflater. The inflater contains a gas-generating agent. The gas-generating agent generates a gas when ignited. The thus generated gas raises the rod 25 with the pressure thereof so as to bring the hood 21 to the lifted position.

Discussion will be made as to the construction of the hood retaining means 30 in relation to FIG. 2 and FIG. 3.

Figure 2:
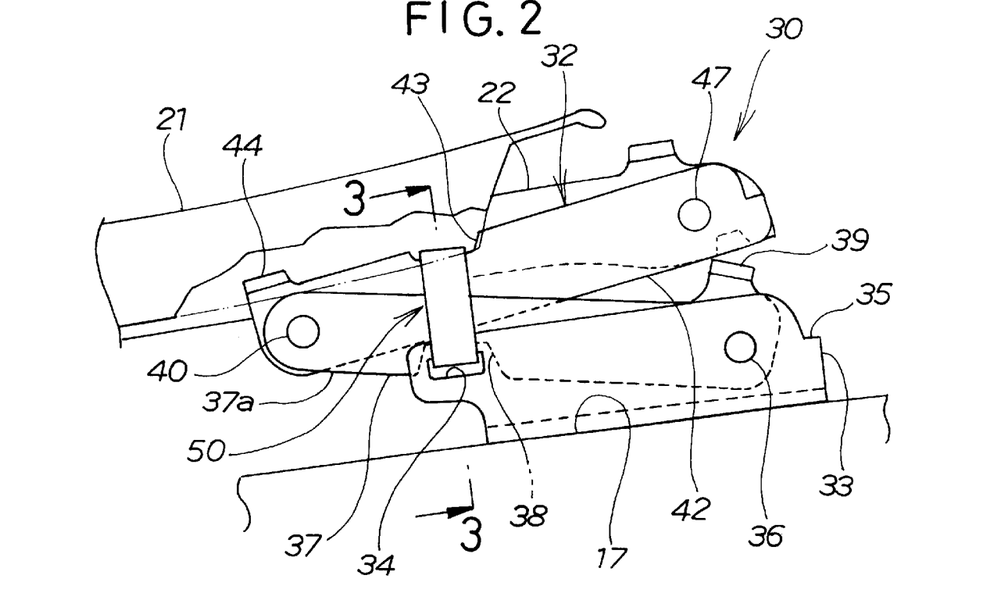
FIG. 2 is a side elevational view of the vehicular hood apparatus shown in FIG. 1.

Turning to FIG. 2, the hood retaining means 30 includes a link mechanism 32 interposed between the hood 21 and the vehicle body frame 17 provided on the side of a vehicle body, and a temporal fastening member 50 for temporally fastening the link mechanism 32. The mechanism 32 is extended and contracted in correspondence to upward and downward motions of the hood 21. When the mechanism 32 is contracted, the member 50 fastens the contracted link mechanism 32 to the vehicle body frame 17 so as to prevent the contracted mechanism 32 from rattling. The member 50 is strengthened to such an extent as to be cut when the link mechanism 32 is extended.

The link mechanism 32 includes a lower link 37 and an upper link 42. The lower link 37 pivots on a lower pin 36 through which a lower end portion (one end portion) of the lower link 37 is attached to a bracket 33 mounted on the frame 17. The upper link 42 pivots on an upper pin 47 through which an upper end portion (one end portion) of the upper link 42 is attached to a hood arm 22 mounted to the hood 21. The lower link 37 and the upper link 42 also pivot on a connecting pin 40 through which an upper end portion 37a (another end portion) of the lower link 37 is connected to a lower end portion (another end portion) of the upper link 42. More specifically, the lower link 37 and the upper link 42 pivot towards and away from each other on the connecting pin 40.

The bracket 33 has its front portion forming therein an opening portion 34 into which the member 50 is fitted. At a rear end portion of the bracket 33, there is formed a step portion 35 for holding the link mechanism 32 in an extended position.

The lower link 37 includes a recessed portion 38 formed substantially centrally thereof, and a bent stopper 39 formed at the lower end portion thereof. Provision of the recessed portion 38 prevents interference between the lower link 37 and the member 50. The link mechanism 32 is held in a contracted position with the bent stopper 39 abutting against the upper end portion of the upper link 42. Also, the link mechanism 32 is held in the extended position with the bent stopper 39 abutting against the step portion 35.

Figure 7:
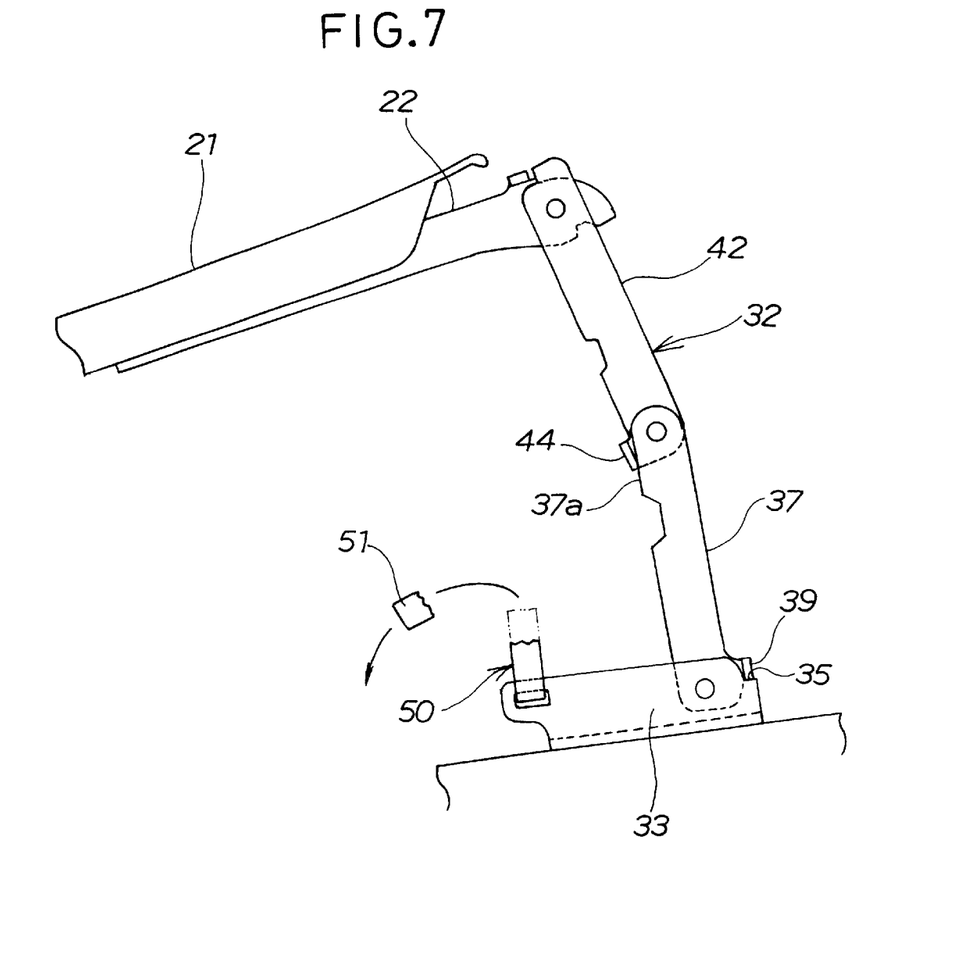
FIG. 7 is a view showing how the link mechanism is extended to lift the hood.

The upper link 42 includes a recessed portion 43 formed substantially centrally thereof, and a bent stopper 44 formed at the lower end portion thereof. The recessed portion 43 is formed such that the member 50 is locked in place. The link mechanism 32 is held in the extended position with the bent stopper 44 abutting against the upper end portion 37a of the lower link 37. By thus holding the link mechanism 32 in the extended position, it becomes possible to hold the hood 21 in the lifted position, as shown in FIG. 7.

Figure 3:
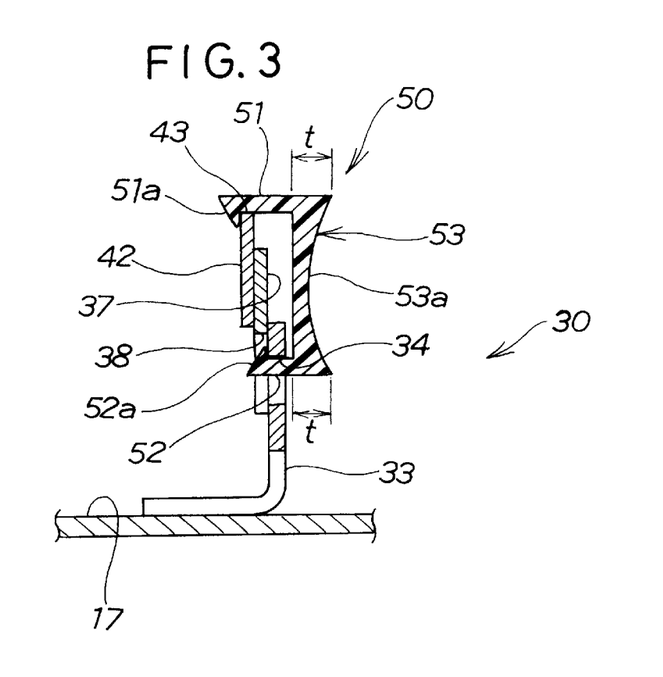
FIG. 3 is an enlarged cross-sectional view taken along line 3—3 of FIG. 2.

Reference is made to FIG. 3. The member 50 has a channel-shaped configuration and is formed of resinous material. The member 50 is resiliently deformable. The member 50 includes an upper piece 51, a lower piece 52, and a connecting piece 53 provided between the upper and lower pieces 51, 52. Formed at the upper piece 51 is an upper claw 51a of wedge-shaped configuration. Similarly, at the lower piece 52, there is formed a lower claw 52a of wedge-shaped configuration. The connecting piece 53 has an outer wall 53a of curved configuration.

Each of the upper and lower pieces 51, 52 has a thickness t greater than that of a central portion of the connecting piece 53. By thus providing the upper and lower pieces 51, 52 and the outer wall 53a thus arranged, it is unlikely that the upper and lower pieces 51, 52 are readily flexed upwardly and downwardly, respectively. Therefore, the lower piece 52 is locked on the opening portion 34 of the bracket 33 while the upper piece 51 is locked on the recessed portion 43 of the upper link 42 to thereby ensure that the link mechanism 32 contracted (as shown in FIG. 2) is fastened to a side of the vehicle body frame 17.

Therefore, the contracted link mechanism 32 (see FIG. 2) is fixed with the member 50 alone (that is, the rattling of the link mechanism 32 is prevented) to thereby prevent the hood 21 (see FIG. 2) from vertically rattling. As a result, it becomes possible to reduce the number of parts for preventing the rattling of the hood 21. Since the number of parts for preventing the rattling of the hood 21 is reduced as stated above, the size of a device for preventing the rattling of the hood 21 can be made small to thereby provide an increased freedom to design the apparatus.

Each of the upper and lower claws 51a, 52a is formed to have the wedge-shaped configuration, as described above. It is therefore unlikely that vibration of the vehicle body frame 17 occurring during the running of the vehicle 10 causes the upper claw 51a and the lower claw 52a to come out of the recessed portion 43 of the upper link 42 and the opening portion 34 of the bracket 33, respectively. Namely, even when the vehicle body frame 17 is vibrated during the running of the vehicle 10, the member 50 is unlikely to be detached from the link mechanism 32.

Figure 4:
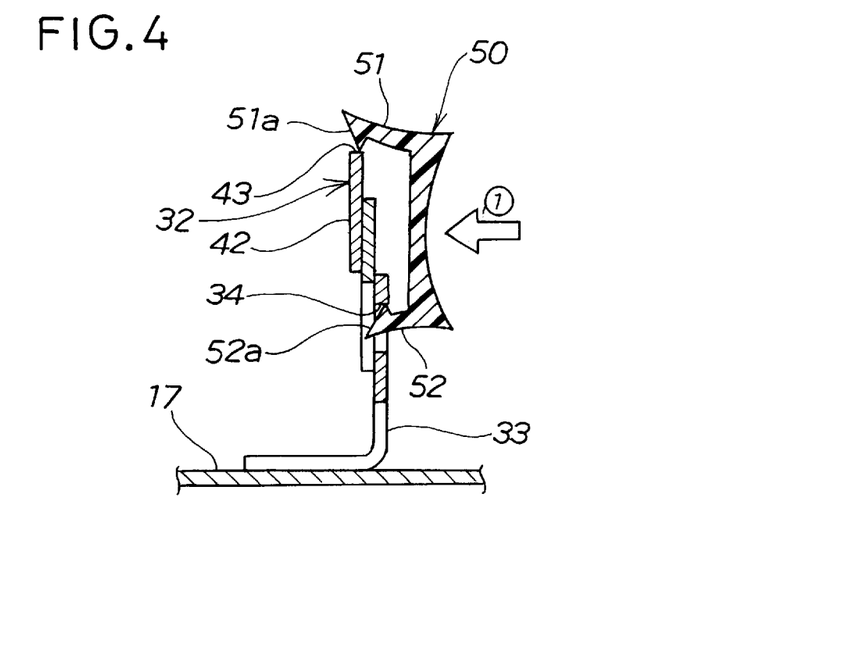
FIG. 4 is a view showing, in correspondence to FIG. 3, how a temporal fastening member fastens a link mechanism of the vehicular hood apparatus.

Discussion will be made as to how the link mechanism 32 is fixed with the member 50 in relation to FIG. 4. The member 50 is initially pressed against the link mechanism 32, as indicated by an arrow ①. This causes the upper piece 51 and the lower piece 52 to resiliently deform upwardly and downwardly, respectively, as shown in FIG. 4. Thereafter, the upper claw 51a and the lower claw 52a come into engagement with the recessed portion 43 of the upper link 42 and the opening portion 34 of the bracket 33, respectively, as shown in FIG. 3. Thus, the link mechanism 32 can be held in the contracted position by means of the member 50. It will be appreciated that the member 50 can be locked in place through a single step of merely pressing the member 50 against the link mechanism 32 as indicated by the arrow ①.

Figure 5:
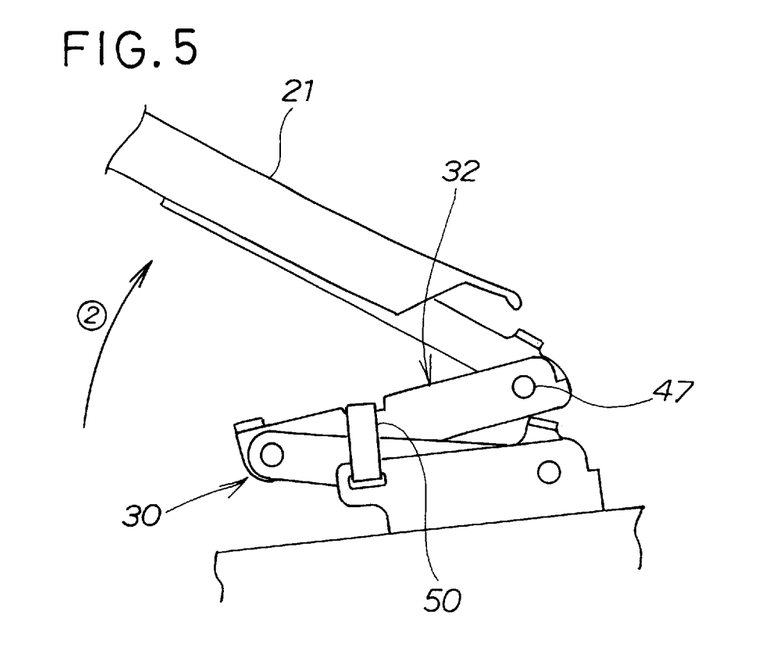
FIG. 5 is a side elevational view of the apparatus having a hood opened.

Reference is made to FIG. 5. When the hood 21 is released from the hood lock (not shown) provided at the front part of the hood 21, the hood 21 pivots upwardly on the upper pin 47 provided on a side of the rear end of the hood 21, as indicated by an arrow ② of FIG. 5, thereby opening the engine room 14. By thus releasing the hood 21 from the hood lock to open the engine room 14, it becomes possible to repair or check machines disposed within the engine room 14. Thus, the hood 21 can be opened with the member 50 fixedly mounted on the contracted link mechanism 32.

Operation of the vehicular hood apparatus 20 will be described hereinbelow.

When the vehicle 10 hits the obstacle 18 as shown in FIG. 1, the bumper sensor 26, the floor sensor 27, and the vehicle speed sensor 28 are cooperated to detect the hitting of the vehicle 10 and then supply the controlling section 29 with detecting signals for indicating the detection of the hitting. The controlling section 29 then provides the actuator 24 with a drive signal for driving the actuator 24, whereupon the actuator 24 generates the gas pressure for causing the rod 25 to project.

Figure 6A:
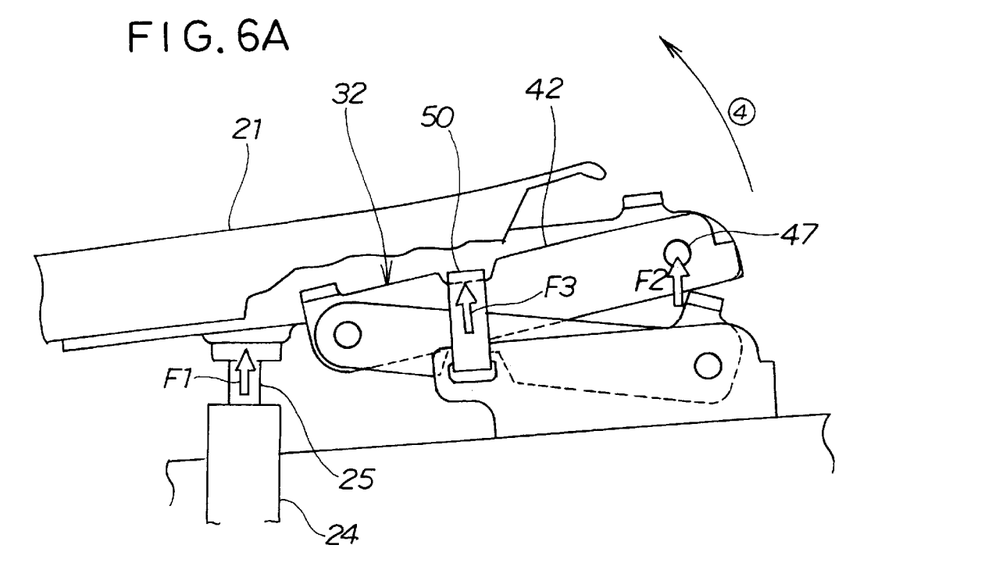
FIG. 6A is a view showing how the apparatus is operated when the hood of the apparatus is pushed by an actuator.

When the gas pressure is applied to the rod 25 of the actuator 24, the rod 25 applies a force to the hood 21, as indicated by an arrow F1 of FIG. 6A, so as to push up the hood 21. Thereupon, an external force as shown by an arrow F2 is applied to the upper pin 47 while an external force as shown by an arrow F3 is applied to the member 50.

Figure 6B:
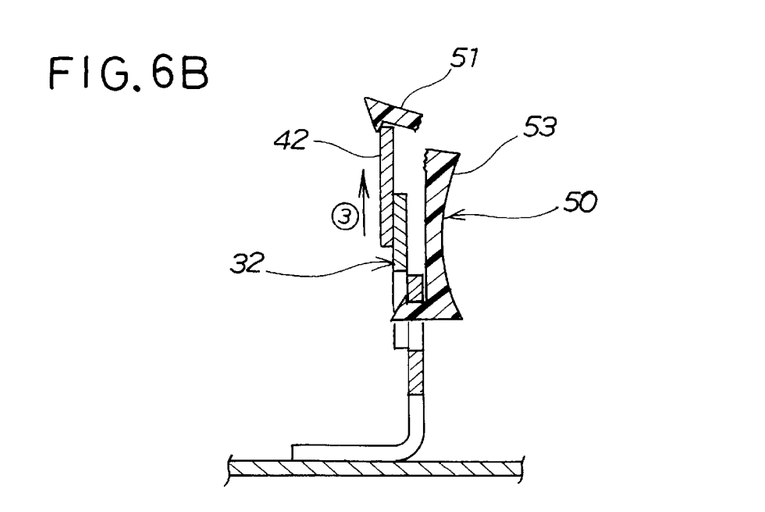
FIG. 6B is a cross-sectional view of the member cut.

Since the external force is applied to the member 50, as shown by the arrow F3, the upper piece 51 of the member 50 is cut off from the connecting piece 53, as shown in FIG. 6B to thereby free the contracted link mechanism 32. The rod 25 is then raised with the gas pressure to thereby push up the hood 21, as shown in FIG. 6A, whereupon the upper link 42 of the link mechanism 32 is also raised, as shown by an arrow ③ in FIG. 6B, to thereby extend the link mechanism 32. As a result, the hood 21 is lifted up, as shown by an arrow ④ of FIG. 6A.

By merely cutting the member 50 as described above, it becomes possible to extend the contracted link mechanism 32. Thus, there is no need to provide a separate member for extending the link mechanism 32 to thereby reduce the number of parts for extending the link mechanism 32.

Since the rod 25 (see FIG. 6A) is rapidly raised with the gas pressure to thereby push up hood 21, as discussed above, the hood 21 is lifted a predetermined amount to thereby bring the upper link 42 and the lower link 37 into substantially vertical alignment with each other, as shown in FIG. 7. With the upper link 42 and the lower link 37 thus aligned with each other, the bent stopper 39 of the lower link 37 is locked by the step portion 35 of the bracket 33 while the bent stopper 44 of the upper link 42 is locked by the upper end portion 37a of the lower link 37. Therefore, the extended link mechanism 32 is locked with the upper link 42 and the lower link 37 substantially aligned with each other. The hood 21 thus lifted the predetermined amount is then held in the lifted position.

Figure 8:
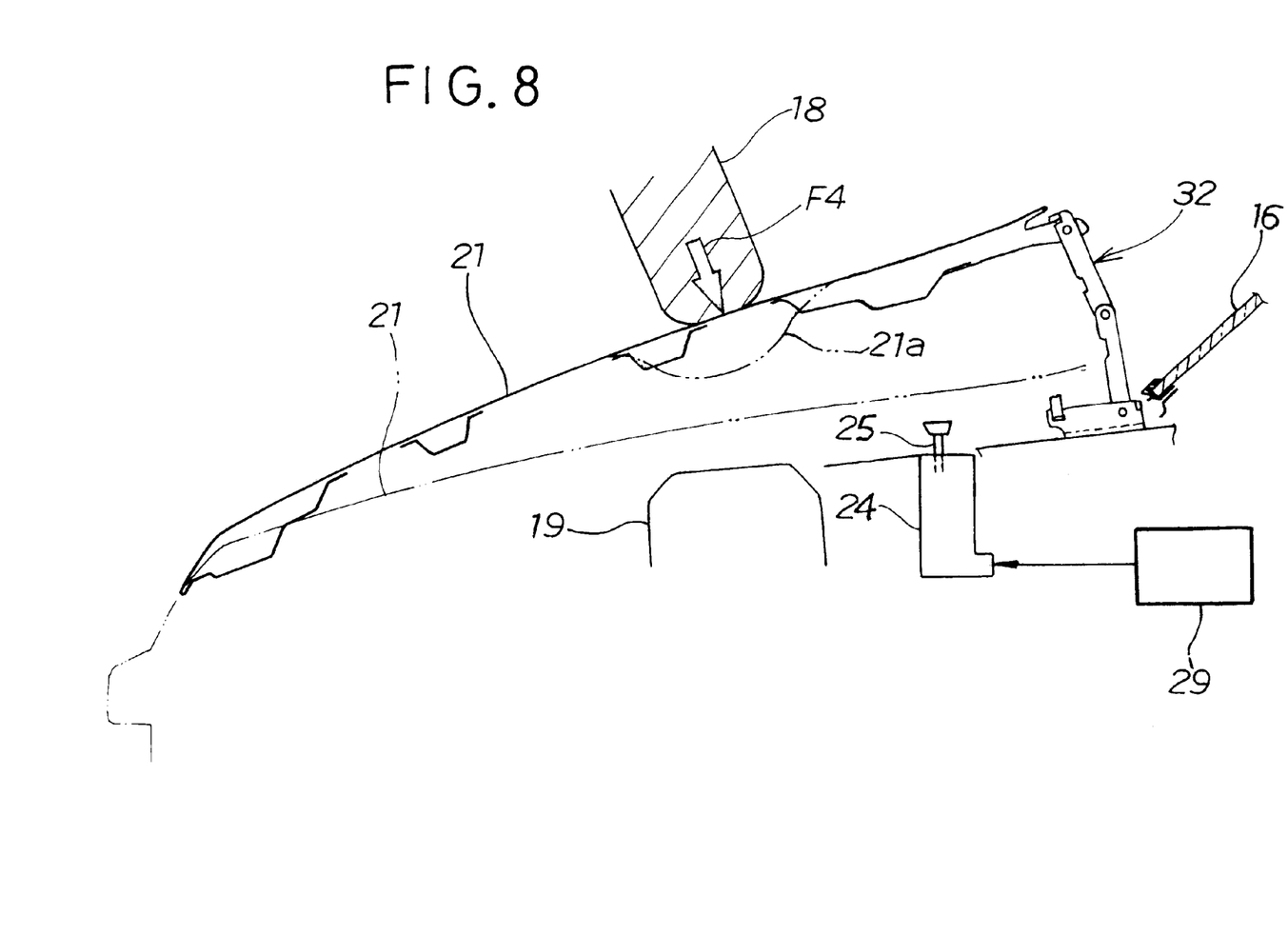
FIG. 8 is a view showing how the hood lifted is concavely deformed upon the impact of an obstacle thereon.

As shown in FIG. 8, when the hood 21 is lifted from the contracted position, shown by a phantom line, to the lifted position, shown by a solid line, in the above-mentioned manner, a large space is provided between the hood 21 and a device 19 such as an engine disposed within the engine room 14. The provision of such a large space allows the hood 21 to sufficiently deform downwardly. When the vehicle 10 hits the obstacle 18 and the obstacle 18 is thereby thrown towards the hood 21, the obstacle 18 comes into impact on the hood 21 to thereby apply a large force to the hood 21, as indicated by an arrow F4 of FIG. 8. The hood 21 is then deformed downwardly to provide a large recessed portion 21a shown by a phantom line. It thus becomes possible to reduce the impact of the obstacle 18 on the hood 21.

Further, even when the large recessed portion 21a is formed as stated above upon the impact of the obstacle 18 on the hood 21, there is no longer contact between the recessed portion 21a and the device 19 within the engine room. The device 19 can thus be protected from the obstacle 18.

As described above, the upper piece 51 is cut off from the connecting piece 53. However, the member 50 may include a portion to be cut off other than the upper piece 51. Such a portion may be a cutout-formed portion.

Although the member 50 has been described which has the cross-section of channel-shaped configuration, it may be formed to have any other cross-sectional configuration.

The member 50 is formed of resinous material in the illustrated embodiment, however, it may be made of other material.

On each of the right and left sides of the vehicle body frame 17, there are provided the actuator 24 and the hood retaining means 30 as described above. However, for the purpose of reducing the number of parts of the actuator 24 and the hood retaining means 30, they may be provided on either of the right and left sides of the vehicle body frame 17. This leads to a reduced cost of the actuator 24 and the hood retaining means 30.

Although the actuator 24 is mounted to the vehicle body frame 17 in the illustrated embodiment, it may be provided on a side of the hood 21.

Obviously, various minor changes and modifications of the present invention are possible in the light of the above teaching. It is therefore to be understood that within the scope of the appended claims, the present invention may be practiced otherwise than as specifically described.

What is claimed is:

1. A vehicular hood apparatus (20) including a hood (21) positioned at a front part of a vehicle (10), wherein when said vehicle hits an obstacle (18), said hood is lifted a predetermined amount and then held in a lifted position, said apparatus comprising:

a link mechanism (32) interposed between said hood and a vehicle body frame (17) of said vehicle, said mechanism being extended and contracted in correspondence to upward and downward motions of said hood; and a temporal fastening member (50) strengthened to such an extent as to be cut when the link mechanism is extended, wherein when said link mechanism is contracted, said temporal fastening member fastens said contracted link mechanism to a side of said vehicle body so as to prevent said contracted link mechanism from rattling.

2. A vehicular hood apparatus as claimed in claim 1, wherein said link mechanism (32) comprises:

a bracket (33) mounted on said vehicle body frame;

a hood arm (22) mounted to said hood;

a lower link (37) pivoting on a lower pin (36) through which one end portion of said lower link is attached to said bracket;

an upper link (42) pivoting on an upper pin (47) through which one end portion of said upper link is attached to said hood arm; and a connecting pin (40) through which another end portion of said lower link is connected to another end portion of said upper link, said lower link and said upper link pivoting towards and away from each other on said connecting pin.

3. A vehicular hood apparatus as claimed in claim 1, wherein said temporal fastening member (50) includes a cutout-formed portion to be cut off.

* * * * *